(12) United States Patent
Wang et al.

(10) Patent No.: US 9,324,024 B2
(45) Date of Patent: Apr. 26, 2016

(54) PSEUDO MESSAGE RECOGNITION BASED ON ONTOLOGY REASONING

(75) Inventors: Xiaodong Wang, Shanxi (CN); Jun Fang, Shanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 358 days.

(21) Appl. No.: 13/810,815

(22) PCT Filed: Feb. 3, 2012

(86) PCT No.: PCT/CN2012/070876
§ 371 (c)(1),
(2), (4) Date: Jan. 17, 2013

(87) PCT Pub. No.: WO2013/113169
PCT Pub. Date: Aug. 8, 2013

(65) Prior Publication Data
US 2013/0204829 A1 Aug. 8, 2013

(51) Int. Cl.
*G06F 17/00* (2006.01)
*G06N 5/02* (2006.01)
*G06N 5/04* (2006.01)

(52) U.S. Cl.
CPC .. *G06N 5/02* (2013.01); *G06N 5/04* (2013.01); *G06N 5/022* (2013.01); *G06N 5/025* (2013.01)

(58) Field of Classification Search
None
See application file for complete search history.

(56) References Cited

U.S. PATENT DOCUMENTS

| 6,542,538 | B2 * | 4/2003 | Fischel et al. | 375/224 |
|---|---|---|---|---|
| 8,358,783 | B2 * | 1/2013 | Davis et al. | 380/270 |
| 8,510,467 | B2 * | 8/2013 | Legrand et al. | 709/238 |
| 2003/0204717 | A1 * | 10/2003 | Kuehnel | 713/150 |
| 2008/0126491 | A1 * | 5/2008 | Portele et al. | 709/206 |
| 2008/0216094 | A1 * | 9/2008 | Anderson et al. | 719/318 |
| 2012/0042395 | A1 | 2/2012 | Jain et al. | |
| 2013/0290338 | A1 * | 10/2013 | Lee et al. | 707/739 |

FOREIGN PATENT DOCUMENTS

| CN | 102064935 A | 5/2011 |
|---|---|---|
| JP | 2005-192129 A | 7/2005 |
| JP | 2007-501539 A | 1/2007 |
| WO | 2005011195 A2 | 2/2005 |

OTHER PUBLICATIONS

Blind Equalization and Multiuser Detection in Dispersive CDMA Channels Xiaodong Wang and H. Vincent Poor, Fellow, IEEE—1998.*
"Message Authentication Method Based on Hash Function" Xiao Huangpei, Zhang Guoji, Computer engineering, (Mar. 2007) vol. 33, No. 06, pp. 101-103.

(Continued)

*Primary Examiner* — Kakali Chaki
*Assistant Examiner* — Ababacar Seck
(74) *Attorney, Agent, or Firm* — Brundidge & Stanger, P.C.

(57) ABSTRACT

In some examples, a method for recognizing a pseudo message is described. The method may include receiving a message intended for a recipient having an associated recipient Ontology. The method may also include semantically analyzing content of the message to determine whether the content is inconsistent with any rules in the recipient Ontology. The method may also include, upon a determination that the content is inconsistent with a rule in the recipient Ontology, authenticating the message as a pseudo message.

25 Claims, 7 Drawing Sheets

(56) References Cited

OTHER PUBLICATIONS

"The Security Analysis of a Kind of Pseudo-Message Authentication Code" Zhang Xue,Li Rui-lin,Sun Bing, Computer Engineering and Science, ISSN 1007-130X, vol. 31, No. 2, pp. 11-13, 2009.

International Search Report from International Application No. PCT/CN2012/070876 mailed Nov. 8, 2012.

Berman, F., "From TeraGrid to knowledge grid," Communications of the ACM, vol. 44, No. 11, pp. 27-28 (Nov. 2001).

Contini, S. and Yin, Y. L., "Forgery and partial key-recovery attacks on HMAC and NMAC using hash collisions," Proceedings of the 12th international conference on Theory and Application of Cryptology and Information Security, 16 pgs. (2006).

Leacock, C., and Chodorow, M., "Combining Local Context and Wordnet Similarity for Word Sense Identification," Edited by Fellbaum, C., WordNet: An electronic lexical data-base, MIT Press, pp. 265-283 (1998).

Kaya, A. & Selzer, K., "Design and Implementation of a Benchmark Testing Infrastructure for the DL System Racer," Proceedings of the KI-2004 International Workshop on Applications of Description Logics (ADL'04), Ulm, Germany, pp. 1-10 (2004).

\* cited by examiner

PSEUDO MESSAGE RECOGNITION BASED ON ONTOLOGY REASONING

CROSS-REFERENCE TO RELATED APPLICATION

This application is the National Stage filing under 35 U.S.C. §371 of PCT Application No. PCT/CN2012/70876, filed on Feb. 3, 2012.

BACKGROUND

Unless otherwise indicated herein, the materials described herein are not prior art to the claims in the present application and are not admitted to be prior art by inclusion in this section.

Pseudo messages may be used in cloud computing environments for applications including network performance testing, information security, and communication synchronization. For example, an engineer may check the health status of a network or server for quality of service guarantees by sending a pseudo message through the network and/or server. When the pseudo message is received, one or more parameters may be measured that are indicative of the health status. As another example, pseudo messages may be randomly mixed with normal messages to confuse wiretappers for information security. Unfortunately, pseudo messages can confuse the intended recipient and/or be difficult for the intended recipient to identify.

SUMMARY

Technologies described herein generally relate to the generation and identification of pseudo messages based on Ontology reasoning.

In some examples, a method for recognizing a pseudo message is described. The method may include receiving a message intended for a recipient having an associated recipient Ontology. The method may also include semantically analyzing content of the message to determine whether the content is inconsistent with any rules in the recipient Ontology. The method may also include, upon a determination that the content is inconsistent with a rule in the recipient Ontology, authenticating the message as a pseudo message.

In some examples, a method for generating a pseudo message recognizable as such by an intended recipient is described. The method may include generating an error sentence that is inconsistent with a rule in a recipient Ontology associated with a recipient. The method may also include selecting a piece of text as background content. The method may also include inserting the error sentence into the background content to form the pseudo message.

In some examples, a system for generating and recognizing pseudo messages is described. The system may include a first processor and a first non-transitory computer-readable medium. The first non-transitory computer-readable medium may have computer-executable instructions stored thereon that are executable by the first processor to perform operations. The operations may include receiving messages intended for a recipient having an associated recipient Ontology. The operations may also include semantically analyzing content of each received message to determine whether the content is inconsistent with any rules in the recipient Ontology. The operations may also include, upon a determination that the content of a message is inconsistent with a rule in the recipient Ontology, authenticating the message as a pseudo message.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
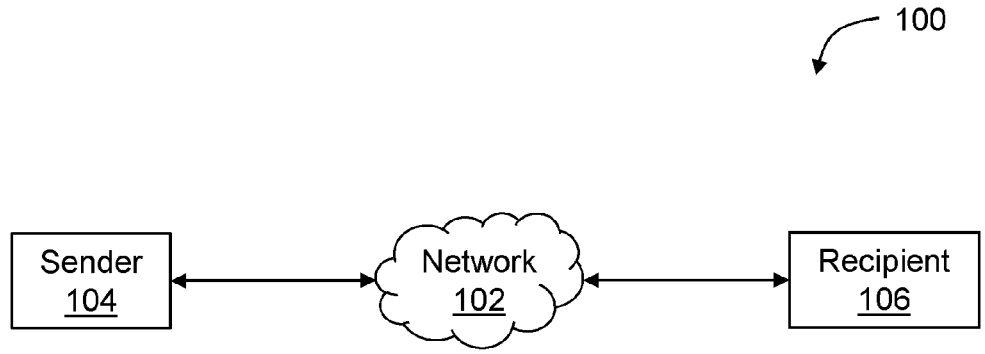
FIG. 1 is a block diagram of an example system for implementing pseudo message recognition based on Ontology reasoning.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein implement pseudo message recognition based on Ontology reasoning. A sender may generate a sender-self Ontology including information about the sender. The sender may also generate or receive a recipient-other Ontology including information about a recipient. Similarly, the recipient may generate a recipient-self Ontology including information about the recipient and may generate or receive a sender-other Ontology including information about the sender.

The sender may generate a pseudo message including content that is inconsistent with a rule in the recipient-other Ontology. In particular, the sender may select a rule from among multiple rules in the recipient Ontology. The selected rule may be expressed as a correct sentence. A word representing a concept of the selected rule within the sentence may be replaced with an irrelevant word from an available lexicon to form an error sentence. The sender may also select a piece of text as background content and may insert the error sentence into the background content to form the pseudo message. The pseudo message may be sent to the recipient along with other messages.

The recipient-other Ontology may generally include a subset of the recipient-self Ontology such that any rule in the recipient-other Ontology may also be included as a rule in the recipient-self Ontology. As such, the recipient may receive messages from the sender and use the recipient-self Ontology to identify pseudo messages from amongst the received messages. In particular, for each message, the recipient may semantically analyze content of the message to determine whether the content is inconsistent with any rules in the recipient-self Ontology. Upon a determination that the content is inconsistent with a rule in the recipient-self Ontology, the message may be authenticated as a pseudo message.

FIG. 1 is a block diagram of an example system 100 for implementing pseudo message recognition based on Ontology reasoning, arranged in accordance with at least some embodiments described herein. The system 100 may include a network 102, a sender 104 and a recipient 106.

In general, the network 102 may include one or more wide area networks (WANs) and/or local area networks (LANs) that enable the sender 104 and the recipient 106 to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

Figure 2:
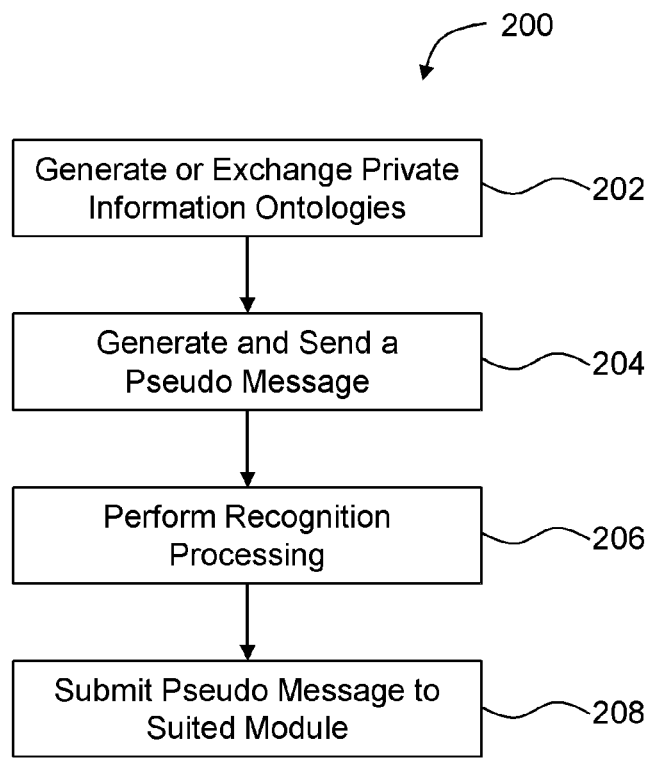
FIG. 2 shows an example flow diagram of a method for implementing pseudo message recognition based on Ontology reasoning.

Each of the sender 104 and the recipient 106 may include a computing device configured to perform one or more operations associated with implementing pseudo message recognition based on Ontology reasoning, such as described with respect to FIG. 2. For instance, the computing device associated with each of the sender 104 and the recipient 106 may include a processor and a memory or other non-transitory computer-readable medium. The non-transitory computer-readable medium may include computer-executable instructions stored thereon that are executable by the processor to perform the operations described herein, additional details of which are provided below.

FIG. 2 shows an example flow diagram of a method 200 for implementing pseudo message recognition based on Ontology reasoning, arranged in accordance with at least some embodiments described herein. The method 200 may be performed in whole or in part by one or more of the sender 104 and the recipient 106 of FIG. 1. The method 200 includes various operations, functions or actions as illustrated by one or more of blocks 202, 204, 206, and/or 208. The method 200 of FIG. 2 is described below in the context of FIG. 1 and may begin at block 202.

In block 202 (Generate or Exchange Private Information Ontologies), private information ontologies are generated and/or exchanged. For instance, the sender 104 may generate a sender-self Ontology associated with the sender 104 while the recipient 106 may generate a recipient-self Ontology associated with the recipient 106. As used herein, a private information Ontology may be associated with a particular entity such as the sender 104 or the recipient 106 if it includes information about the particular entity. Further, a "self" Ontology may refer to an Ontology including information about the same entity that has access to the Ontology.

To the extent the sender 104 and recipient 106 may be familiar with each other and/or may know information about each other, each may also generate a private information Ontology associated with the other based on their respective knowledge of the other. For instance, the sender 104 may generate a recipient-other Ontology associated with the recipient 106 based on the sender's 104 knowledge of the recipient 106, while the recipient 106 may generate a sender-other Ontology associated with the sender 104 based on the recipient's 106 knowledge of the sender 104. An "other" Ontology may refer to an Ontology including information about a different entity than has access to the Ontology.

In general, the recipient-other Ontology generated by the sender 104 may be a subset of the recipient-self Ontology generated by the recipient 106 as the recipient 106 may know more information about itself than the sender 104. Similarly, the sender-other Ontology generated by the recipient 106 may be a subset of the sender-self Ontology generated by the sender 104 as the sender 104 may know more information about itself than the recipient 106. The recipient-self Ontology and the recipient-other Ontology may be collectively referred to hereinafter as the recipient Ontology, while the sender-self Ontology and the send-other Ontology may be collectively referred to hereinafter as the sender Ontology.

To the extent the sender 104 and recipient 106 may not be familiar with each and/or in other circumstances, the sender 104 may send all or a subset of the sender-self Ontology to the recipient 106 as the sender-other Ontology. Analogously, the recipient 106 may send all or a subset of the recipient-self Ontology to the sender 104 as the recipient-other Ontology. Block 202 may be followed by block 204. In these and other embodiments, the sender-other Ontology sent to the recipient 106 and/or the recipient-other Ontology sent to the sender 104 may be encrypted. Block 202 may be followed by block 204.

In block 204 (Generate and Send a Pseudo Message), a pseudo message may be generated and sent from the sender 104 to the recipient 106. In general, a pseudo message may include content that is inconsistent with any rule in the recipient Ontology. In particular, in these and other embodiments, the sender 104 may generate the pseudo message including content that is inconsistent with any rule in the recipient Ontology based on the recipient-other Ontology to which the sender 104 has access. Block 204 may be followed by block 206

In block 206 (Perform Recognition Processing), recognition processing may be performed by the recipient 106 to identify the pseudo message as such. In particular, in these and other embodiments, the recipient 106 may semantically analyze messages received from the sender 104 to identify and compare content of the messages against rules in the recipient-self Ontology to which the recipient 106 has access. Upon determining that a given message includes content that is inconsistent with any rule in the recipient Ontology, the recipient 106 may authenticate the message as a pseudo message. Block 206 may be followed by block 208.

In block 208 (Submit Pseudo Message to Suited Module), the authenticated pseudo message may be submitted to a suited module for further processing. For instance, if the pseudo message is sent for network performance testing, the pseudo message may be submitted to a network performance testing module to measure one or more channel parameters of a channel over which the pseudo messages are transmitted from the sender 104 to the recipient 106.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, pseudo messages may be generated and sent by the sender 104 to the recipient 106 for recognition as such by providing both the sender 104 and the recipient 106 with access to the recipient Ontology. In these and other embodiments, generation and/or exchange of the sender Ontology, whether the sender-self Ontology or the sender-other Ontology, can be omitted from the method 200 of FIG. 2. Alternately or additionally, by providing access to the sender Ontology to both the sender 104 and the recipient 106, pseudo messages may be generated and sent by the recipient 106 to the sender 104 for recognition as such. Accordingly, while the sender 104 has been described above as generating and sending pseudo messages and the recipient has been described above as receiving and recognizing pseudo messages as such, their roles may instead be reversed in some embodiments.

In some embodiments, the sender 104 may use pseudo messages to perform a network performance test for quality of service guarantees of a cloud service. In these and other embodiments, the sender 104 may include an engineer who desires to test, for instance, the all-phase performance of the cloud service. To do so, the engineer, or sender 104, may generate a pseudo message and feed it into the service. When the pseudo message is received and recognized as such at the recipient 106, the engineer may record any desired data, such as time delay, error probability, and/or satisfy degree for one or more of the phases.

Figure 3:
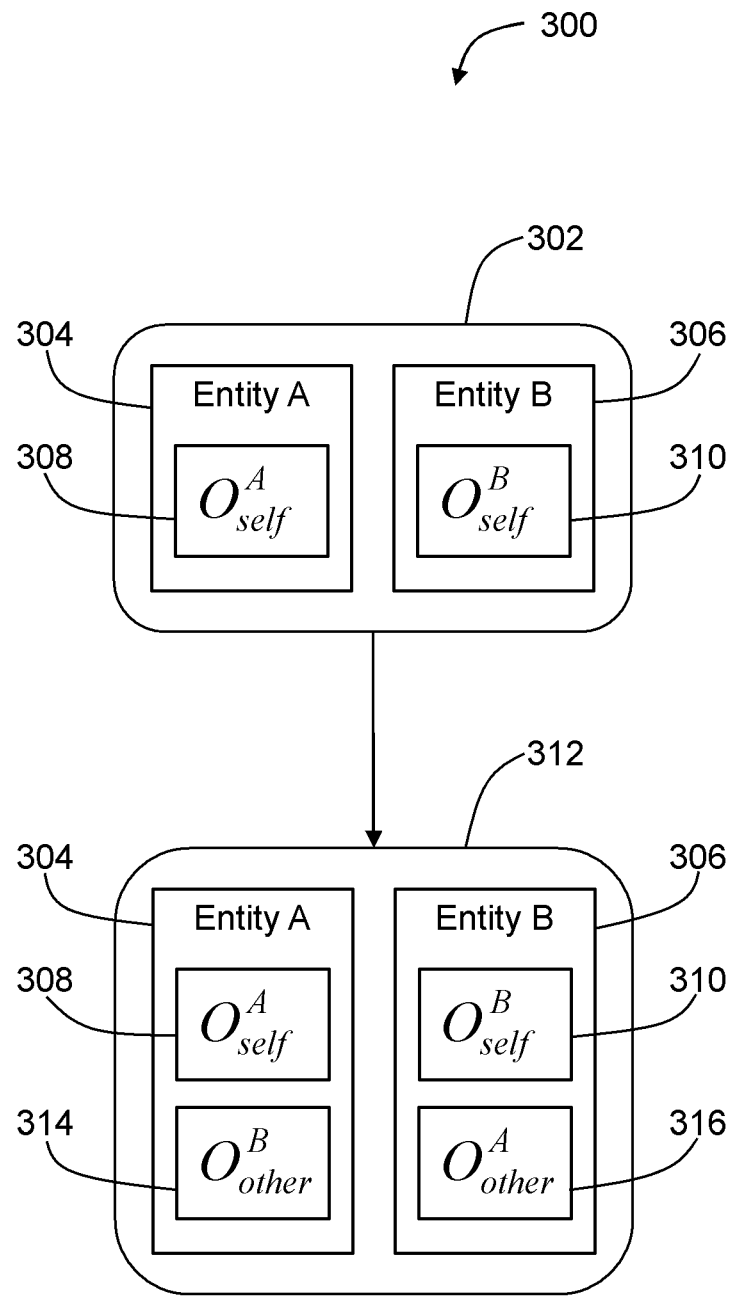
FIG. 3 illustrates various entities and associated ontologies generated during an Ontology generation and/or exchange process.

FIG. 3 illustrates various entities and associated ontologies generated during an Ontology generation and/or exchange process 300, arranged in accordance with at least some embodiments described herein. The process 300 may correspond to, for example, operations associated with block 202 of FIG. 2.

The process 300 may include, at 302, one or both of an entity A 304 and an entity B 306 generating a corresponding "self" Ontology 308 and 310, respectively. The "self" ontologies 308 and 310 are respectively identified in FIG. 3 as $O_{self}^A$ and $O_{self}^B$.

The process 300 may additionally include, at 312, one or both of the entity A 304 and the entity B 306 generating or receiving a corresponding "other" Ontology 314 and 316, respectively. The "other" ontologies 314 and 316 are respectively identified in FIG. 3 as $O_{other}^B$ and $O_{other}^A$. The "self" ontologies 308 and 310 and/or "other" ontologies 314 and 316 may be generated consistent with a predetermined Ontology structure. In some embodiments, the predetermined Ontology structure may include concept nodes and relationship edges, as described in greater detail below with respect to FIG. 4.

When the entity A 304 generates the "other" Ontology 314 associated with the entity B 306 and/or the entity B 306 generates the "other" Ontology 316 associated with the entity A 304, the "other" ontologies 314 and/or 316 may each include a subset of a corresponding one of the "self" ontologies 310 and/or 308. In particular, the entity B 306 may generally know more about itself than the entity A 304 and the entity A 304 may generally know more about itself than the entity B 306.

Alternately or additionally, the entity B 306 may send a copy of all or a portion of its "self" Ontology 310 to the entity A 304 as the "other" Ontology 314, and/or the entity A 304 may send a copy of all or a portion of its "self" Ontology 308 to the entity B 306 as the "other" Ontology 316. In these and other embodiments, the "other" Ontology 314 may be encrypted when sent by the entity B 306 to the entity A 304, and/or the "other" Ontology 316 may be encrypted when sent by the entity A 304 to the entity B 306.

Accordingly, both the entity A 304 and the entity B 306 may have access to an Ontology associated with the entity B 306, namely, the "other" Ontology 314 and the "self" Ontology 310. As such, the entity A 304 may generate pseudo messages including content that is inconsistent with a rule in the Ontology associated with the entity B 306. In particular, according to the monotonic property of Ontology reasoning, the reasoning of the "other" Ontology 314 may be consistent with the reasoning of the "self" Ontology 310 such that if content is inconsistent with a rule in the "other" Ontology 314, it may also be inconsistent with a rule in the "self" Ontology 310. Thus, the entity A 304 may send a pseudo message including content that is inconsistent with a rule in the Ontology associated with the entity B 306 to the entity B 306, where the pseudo message may be recognized as such by the entity B 306 by reference to the "self" Ontology 310. In the foregoing example, the entity A 304 and the entity B 306 may respectively correspond to the sender 104 and the recipient 106 of FIG. 1.

Alternately or additionally, both the entity B 306 and the entity A 304 may have access to an Ontology associated with the entity A 304, namely, the "other" Ontology 316 and the "self" Ontology 308. As such, the entity B 306 may generate pseudo messages including content that is inconsistent with a rule in the Ontology associated with the entity A 304. In particular, according to the monotonic property of Ontology reasoning, the reasoning of the "other" Ontology 316 may be consistent with the reasoning of the "self" Ontology 308 such that if content is inconsistent with a rule in the "other" Ontology 316, it may also be inconsistent with a rule in the "self" Ontology 308. Thus, the entity B 306 may send a pseudo message including content that is inconsistent with a rule in the Ontology associated with the entity A 304 to the entity A 304, where the pseudo message may be recognized as such by the entity A 304 by reference to the "self" Ontology 308. In the foregoing example, the entity B 306 and the entity A 304 may respectively correspond to the sender 104 and the recipient 106 of FIG. 1.

Figure 4:
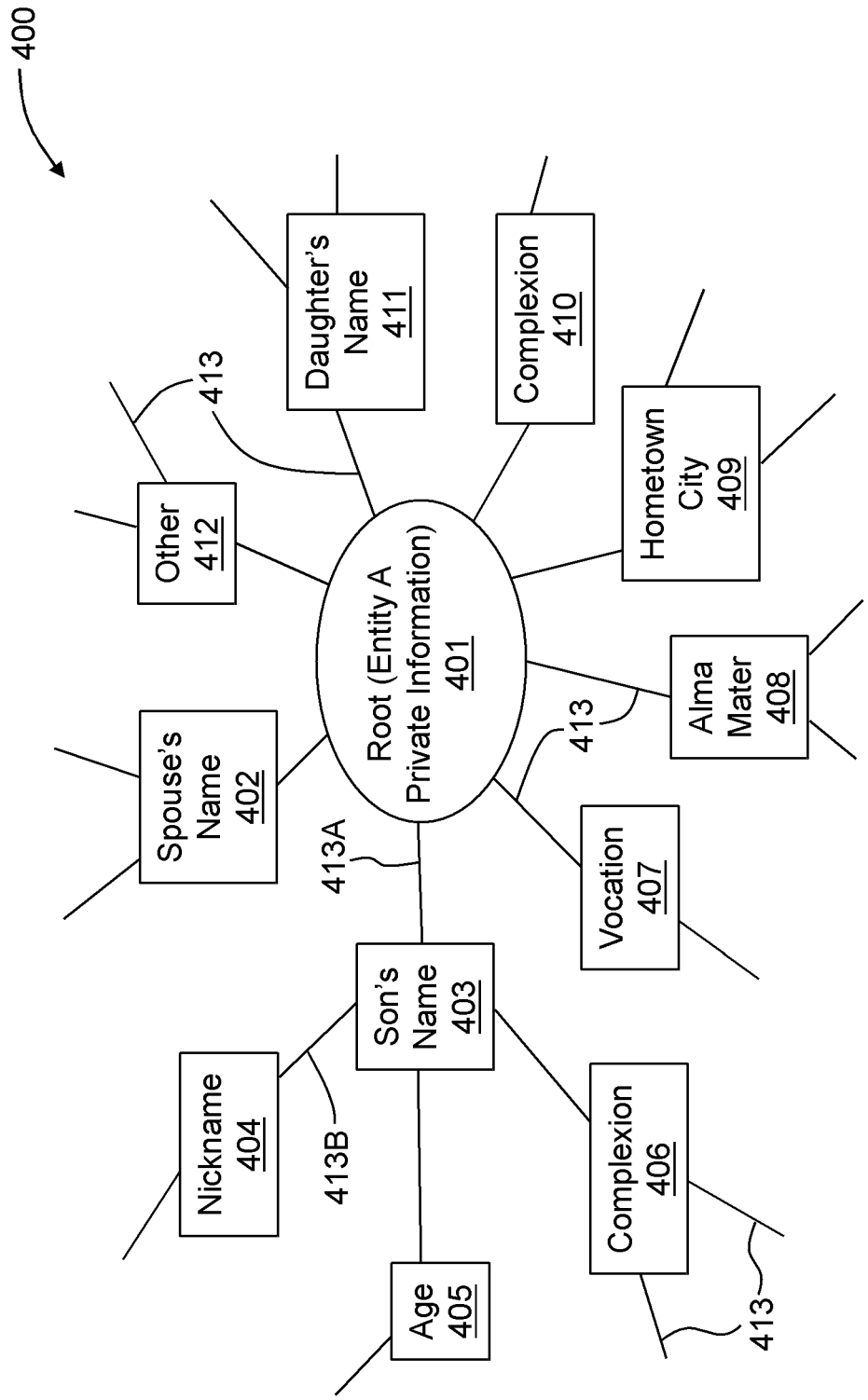
FIG. 4 illustrates an example of an Ontology.

FIG. 4 illustrates an example of an Ontology 400, arranged in accordance with at least some embodiments described herein. The Ontology 400 may correspond to the "self" ontologies 308, 310 and/or the "other" ontologies 314, 316 of FIG. 3, for instance. The Ontology 400 is represented in FIG. 4 in a graphical form, e.g., as a hierarchical tree structure. However, the Ontology 400 can alternately or additionally be represented using statements, as a set of classes and properties, or the like.

The Ontology 400 represents a predetermined Ontology structure generally including multiple concept nodes and multiple relationship edges. In particular, as illustrated in FIG. 4, the Ontology 400 includes concept nodes 401-412. Each of the concept nodes 401-412 represents a particular concept associated with entity A in the illustrated embodiment. The particular concepts are identified generically in FIG. 4, such as "Entity A" for the concept node 401, "Son's Name" for the concept node 403, "Nickname" for the concept node 404, "Vocation" for the concept node 407, and so on. In practice, however, the particular concepts may be identified in the Ontology 400 with more specificity, examples of which may include, but are not limited to, "Jack" for the concept node 401, "William" for the concept node 403, "Bill" for the concept node 404, "Fireman" for the concept node 407, and so on.

The Ontology 400 additionally includes relationship edges 413, only some of which are labeled in FIG. 4 for clarity. The relationship edges 413 include relationship edges 413A, 413B. Each relationship edge 413 may be connected between a corresponding pair of concept nodes 401-412 and may define a relationship between the corresponding pair of concept nodes 401-412.

For example, in the illustrated embodiment, the relationship edge 413A may be connected between the concept node 401 and the concept node 403. Further, the relationship edge 413A may define a particular relationship between the concept node 401 and the concept node 403, such as "Son's Name" is the son of "Entity A," or as a more specific example, "William" is the son of "Jack." As another example, the relationship edge 413B is connected between the concept node 403 and the concept node 404. The relationship edge 413B may define a particular relationship between the concept node 403 and the concept node 404, such as "Nickname" is "Son's Name" nickname, or as a more specific example, "Bill" is "William's" nickname.

The concept node 401 may be referred to as a "root" node, while the concept nodes 402-412 may be referred to as "offspring" nodes. Each of the relationship edges 413 may have a security level secu determined with respect to distance, in terms of intervening concept nodes, between the relationship edge 413 and the root node 401. In particular the security level secu may be determined according to secu=α·dis, where α is a weighting constant such that $1/dis_{MAX} > \alpha > 0$, dis is a number of concept nodes from the root node 401 to the farthest concept node 402-412 connected to the relationship edge 413, and $dis_{MAX}$ is the maximum dis in the Ontology 400. For example, dis for the relationship edge 413A may be 1, while dis for the relationship edge 413B may be 2. As such, the security level secu for each of the relationship edges 413A and 413B may be α or 2α, respectively. More generally, the security level secu for a given relationship edge 413 may be greater the further the given relationship edge 413 is from the root node 401.

The relationships defined by relationship edges 413 represent rules of the Ontology 400. As already described herein, a sender can generate a pseudo message by first generating an error sentence that is inconsistent with a rule in a recipient Ontology. The error sentence may be generated by selecting any rule, represented by any of the relationship edges 413, and expressing the rule as a correct sentence, then modifying it. For example, a word in the correct sentence representing a concept of the rule may be replaced with an irrelevant word from an available lexicon to form the error sentence. For instance, a rule represented by the relationship edge 413A may be selected and correctly expressed as "William is the son of Jack" in an example embodiment. Each of the concept nodes 401, 403 associated with the rule represented by the relationship edge 413A may correspond to a concept of the rule. In the present example, "William" may represent a concept of the rule. As such, a corresponding error sentence may then be formed by replacing "William" with an irrelevant word from an available lexicon such that the error sentence is inconsistent with the rule in the Ontology 400. For instance, by way of example only, and assuming "Jack" does not additionally have a son named "James," "William" may be replaced by "James" to form the error sentence "James is the son of Jack."

Alternately or additionally, the Ontology 400 may be implemented as a data structure stored in a non-transitory computer-readable medium and/or transmitted over a communication channel as an electrical or wireless signal. In these and other embodiments, one or more data structures may be maintained and accessible at different levels of the Ontology 400, such as, but not limited to, one or more parent data structures, one or more child data structures, one or more internal data structures, and/or one or more edge structures. The data structures that implement the concept nodes, relationship edges, and/or other components of the Ontology 400 may include any suitable form of data structure including, but not limited to, data trees, and/or data tables.

In general, as used herein, the term "data structure" may refer to a particular method of mechanism of storing and organizing data and knowledge in a computing environment so that it can be used efficiently.

In these and other embodiments, and with combined reference to FIGS. 1 and 4, a non-transitory computer-readable medium of a computing device associated with the sender 104 may include stored thereon the sender-self Ontology implemented as a first data structure and the recipient-other Ontology implemented as a second data structure. Alternately or additionally, a non-transitory computer-readable medium of a computing device associated with the recipient 106 may include stored thereon the recipient-self Ontology implemented as a third data structure and the sender-other Ontology implemented as a fourth data structure. Here, the terms "first," "second," "third," and "fourth" do not designate any sort of order but rather are simply used to distinguish between the various data structures.

Figure 5:
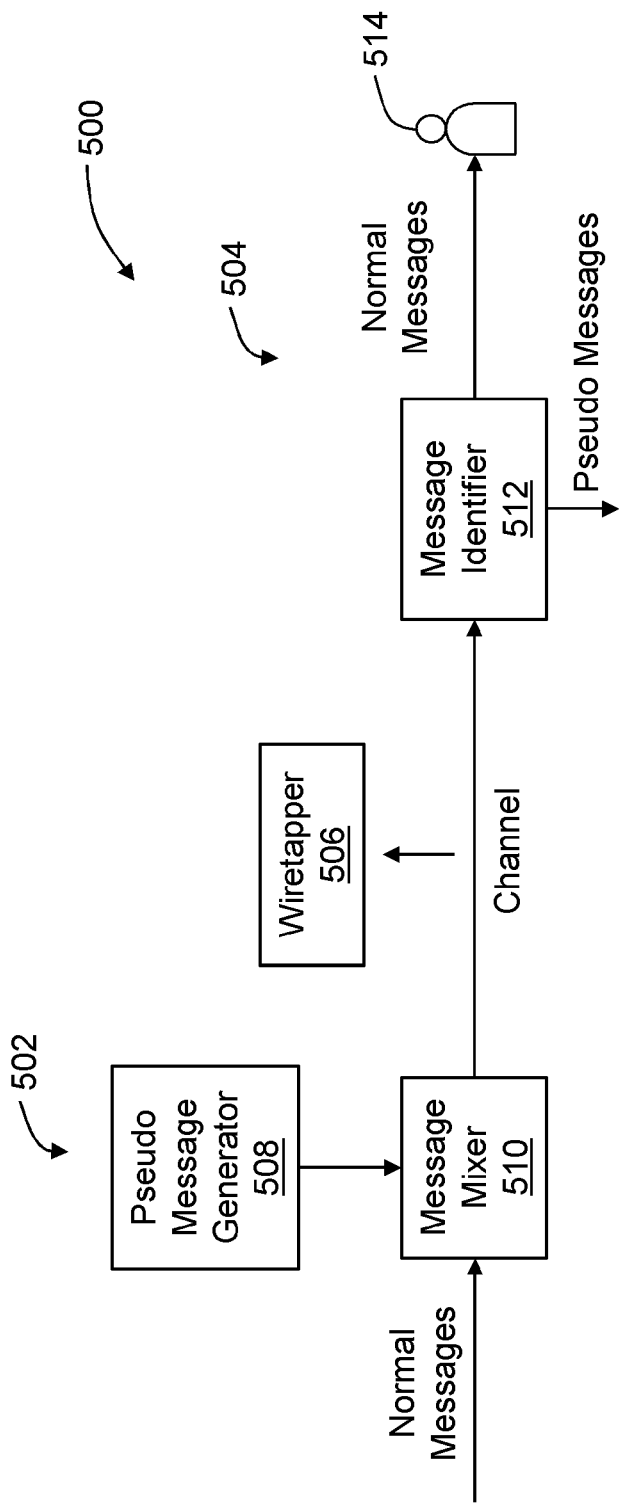
FIG. 5 is a block diagram of another example system for implementing pseudo message recognition based on Ontology reasoning.

FIG. 5 is a block diagram of another example system 500 for implementing pseudo message recognition based on Ontology reasoning, arranged in accordance with at least some embodiments described herein. The system 500 includes a sender 502, a recipient 504 and a wiretapper 506. The sender 502 and the recipient 504 may respectively correspond to the sender 104 and the recipient 106 of FIG. 1.

In the illustrated embodiment, the sender 502 may include a pseudo message generator 508 and a message mixer 510. The pseudo message generator 508 may be configured to generate pseudo messages as described herein. For example, the pseudo message generator 508 may be configured to generate an error sentence that is inconsistent with a rule in a recipient Ontology associated with the recipient 504, and to insert the error sentence into background content that might otherwise be sent in a normal message such that the pseudo message, including the error sentence and the background content, otherwise appears to be a normal message.

The message mixer 510 may be configured to mix the pseudo messages with normal messages that are communicated to the recipient 504 via a communication channel. Because the error sentence is inserted into background content that might otherwise be sent as a normal message, the pseudo message can be hidden from wiretappers 506 or other eavesdroppers listening in on the communication channel between the sender 502 and the recipient 504. According to some embodiments described herein, wiretappers 506 or other unauthorized eavesdroppers of the pseudo message may be unable to identify the pseudo message as such without access to the recipient Ontology or at least to the rule in the recipient Ontology.

The recipient 504 may include a message identifier 512. The message identifier 512 may be configured to perform recognition processing as described with respect to FIG. 2 and in additional detail below to sort the pseudo messages from the normal messages. The message identifier 512 may discard pseudo messages or forward pseudo messages to a suited module for further processing, and/or may forward normal messages for, e.g., reconstructing a website or other content made up by the normal messages for display to a user 514.

In some systems, pseudo messages may include relatively outstanding statistic characteristics insofar as the number of rules in an Ontology is finite, such that the number of available error sentences may also be finite and therefore relatively easy to compromise by wiretappers 506 or other eavesdroppers if pseudo messages are made up only of error sentences. According to some embodiments described herein, however, statistic characteristics of a pseudo message may be obfuscated from wiretappers 506 or other eavesdroppers by inserting the error sentence into background content configured to obfuscate the statistic characteristics of the pseudo message.

Alternately or additionally, pseudo messages may confuse the wiretapper 506. Specifically, by mixing the pseudo messages containing false information, such as error sentences, with normal messages containing true information, the true information may be obfuscated from the wiretapper 506 or other eavesdroppers.

Alternately or additionally, pseudo messages may be automatically generated and sent from a computing device including the pseudo message generator 508 and the message mixer 510 and that is associated with the sender 502. The pseudo messages may be automatically generated and sent to the recipient 504 even when the sender 502 is not actively operating the computing device. Whereas the otherwise absence of communication may indicate to the wiretapper 506 or other eavesdropper that the sender 502 is inactive, the automatic generation and transmission of pseudo messages may obfuscate an inactive status of the sender 502 from the wiretapper 506 or other eavesdropper.

Figure 6:
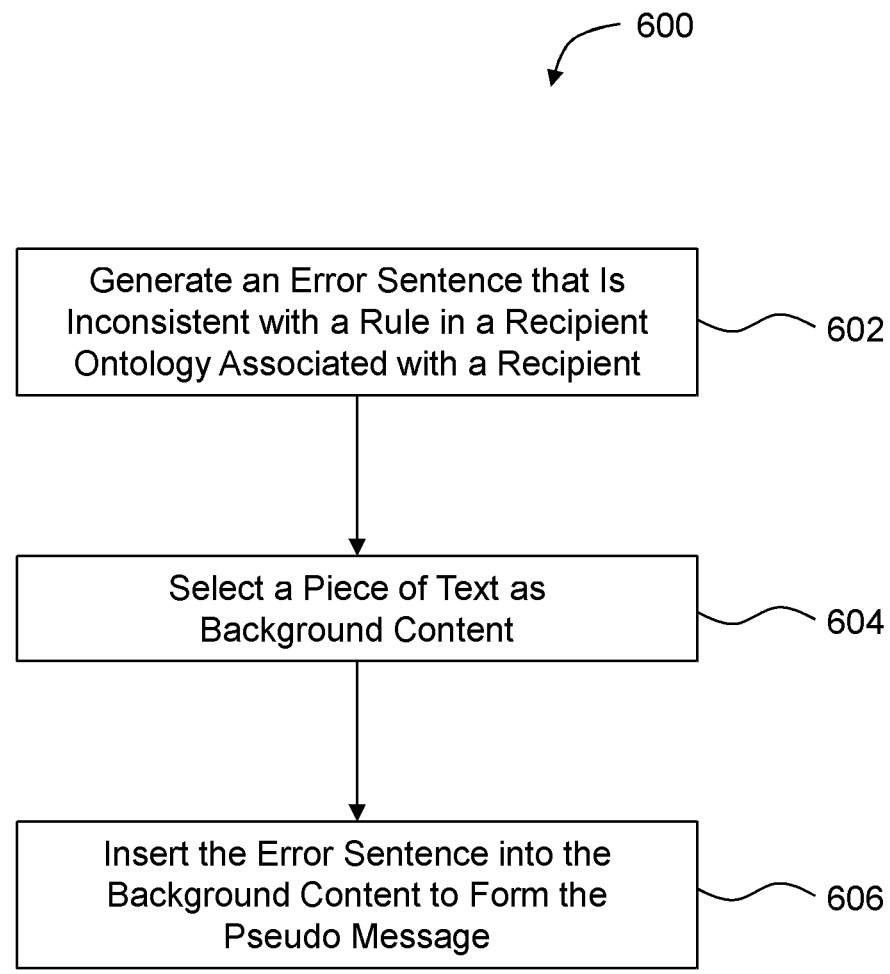
FIG. 6 shows an example flow diagram of a method for generating a pseudo message recognizable as such by an intended recipient.

FIG. 6 shows an example flow diagram of a method 600 for generating a pseudo message recognizable as such by an intended recipient, arranged in accordance with at least some embodiments described herein. The method 600 may be performed in whole or in part by a sender, such as the sender 104 or 502 of FIG. 1 or 5, which sender may correspond to, e.g., the entity A 304 or the entity B 306 of FIG. 3. The method 600 includes various operations, functions or actions as illustrated by one or more of blocks 602, 604 and/or 606. The method 600 may begin at block 602.

In block 602 (Generate an Error Sentence that Is Inconsistent with a Rule in a Recipient Ontology Associated with a Recipient), an error sentence may be generated that is inconsistent with a rule in a recipient Ontology associated with a recipient. Optionally, the error sentence may be expressed in eXtensible Markup Language (XML) format. In some embodiments, generating an error sentence that is inconsistent with a rule in the recipient Ontology may include selecting the rule from among multiple rules of the recipient Ontology and expressing the rule as a correct sentence. A word representing a concept of the rule in the correct sentence may be replaced with an irrelevant word from an available lexicon to form the error sentence.

As described above with respect to FIG. 4, for example, a rule correctly expressed as "William is the son of Jack" may have "William" replaced by "James" to form the error sentence "James is the son of Jack." As another example, a rule correctly expressed as "Bill is William's nickname" may have "Bill" replaced by "Willy" to form the error sentence "Willy is William's nickname." As still another example, a rule correctly expressed as "Jack is a fireman" may have "fireman" replaced by "policeman" to form the error sentence "Jack is a policeman." The foregoing are provided by way of example only and should not be construed as limiting. Returning to FIG. 6, block 602 may be followed by block 604.

In block 604 (Select a Piece of Text as Background Content), a piece of text may be selected as background content into which the error sentence may be inserted. The background content including the piece of text may be extracted from, e.g., any available web pages or other information resource. Block 604 may be followed by block 606.

In block 606 (Insert the Error Sentence into the Background Content to Form the Pseudo Message), the error sentence may be inserted into the background content to form the pseudo message.

In these and other embodiments, selecting a piece of text as background content may include selecting a word set that has at least a predetermined similarity to a normal word set that may be sent to the recipient in another message not including a pseudo message. As such, the pseudo message may be indistinguishable as such from the other message without access to the rule in the recipient Ontology.

In some embodiments, the selected word set may be in an eXtensible Markup Language (XML) format and may be denoted as $X_c$. $X_c$ may include any candidate word set denoted $X_{candidate}$ such that:

$$S = SIM(M_k, X_{candidate}) = \frac{1}{m} \cdot \sum_{j=0}^{m} \max_{i=0}^{n} [sim(w_j^X, w_i^M)] > T.$$

According to the foregoing formula, $S=SIM(M_k, X_{candidate})$ may include a calculated similarity between a normal word set $M_k$ and the candidate word set $X_{candidate}$. The normal word set $M_k$ may belong to a message which comes from a corpus, including a set of daily normal messages of a sender, such as the sender 104 or 502 of FIG. 1 or 5, which sender may correspond to, e.g., the entity A 304 or the entity B 306 of FIG. 3. The candidate word set $X_{candidate}$ may belong to a section or the whole of an XML document which comes from any available information source. T may be the predetermined similarity. The normal word set $M_k$ may include multiple words expressed as $M_k=\{w_0^M, w_1^M, \ldots, w_i^M, \ldots, w_n^M\}$, where $w_i^M$ denotes an arbitrary word in $M_k$ and i is an integer from 0 to n. The candidate word set $X_{candidate}$ may also include multiple words expressed as $X_{candidate}=\{w_0^X, w_1^X, \ldots, w_j^X, \ldots, w_m^X\}$, where $w_j^X$ denotes an arbitrary word in $X_{candidate}$ and j is an integer from 0 to m.

In these and other embodiments, $sim(w_i, w_j)$ may be calculated as follows:

$$sim(w_i, w_j) = \begin{cases} 1, & w_i = w_j \\ sim_{wordnet}, & w_i \neq w_j, \end{cases}$$

where $sim_{wordnet}$ is a similarity calculated according to WordNet. With respect to the similarity calculated according to WordNet, the following reference is herein incorporated by reference in its entirety: Leacock C, Chodorow M, "Combining local context and WordNet similarity for word sense identification,"//FELLBAUMC, WordNet: An electronic lexical data-base, MIT Press. 1998:265-283.

The operations 602, 604, and/or 606 may be performed in any suitable order or no order at all. For instance, the error sentence may be generated before or after selecting a piece of text as background content. Alternately, the error sentence may be generated concurrently with selecting a piece of text as background content.

Although not shown, the method 600 may additionally include sending the pseudo message, or multiple pseudo messages generated as described with respect to FIG. 6, to the recipient. In some embodiments, pseudo messages may be automatically generated and sent from a corresponding sender computing device when a corresponding sender is not actively operating the sender computing device to obfuscate an inactive status of the sender from eavesdroppers.

Alternately or additionally, the pseudo message may be used to identify a security class of a sender of the pseudo message or a priority of the pseudo message, hereinafter both referred to as PRI. The PRI may correspond to the security level secu of the relationship edge from which the error sentence may be derived. Accordingly, when an error sentence is generated from a rule represented by a relationship defined by a relationship edge in the recipient Ontology, the rule may be selected to have a security level secu corresponding to a desired PRI. When the pseudo message is subsequently received by the recipient, the recipient may then determine the security level secu to determine the PRI. In some embodiments, the recipient may preferentially process pseudo messages according to PRI. Alternately or additionally, the recipient may identify the security class to authenticate the sender insofar as a high PRI may indicate that the sender has relatively more intimate knowledge of the recipient than would be the case for a low PRI.

In some embodiments, the method 600 may additionally include generating at least a portion of the recipient Ontology based on the knowledge of a sender of the pseudo message. For instance, as described with respect to FIG. 1, the recipient-other Ontology may be generated by the sender 104, or as described with respect to FIG. 3, the "other" Ontology 314 (or the "other" Ontology 316) may be generated by the entity A 304 (or the entity B 306).

Alternately, the method 600 may additionally include receiving at least a portion of the recipient Ontology from the recipient. For instance, as alternately described with respect to FIG. 1, the recipient-other Ontology may be received by the sender 104 from the recipient 106, or as alternately described with respect to FIG. 3, the "other" Ontology 314 (or the "other" Ontology 316) may be received by the entity A 304 (or the entity B 306) from the entity B 306 (or from the entity A 304).

Accordingly, both the sender and the recipient may have access to at least a portion of the recipient Ontology such that the sender may generate and send pseudo messages recognizable as such to the recipient as already described with respect to FIG. 6. Alternately or additionally, both the sender and the recipient may have access to at least a portion of the sender Ontology such that the method 600 may alternately or additionally include the recipient generating and sending pseudo messages recognizable as such by the sender by including in each pseudo message an error sentence inconsistent with a corresponding rule in the sender Ontology.

Some embodiments disclosed herein include a non-transitory computer-readable medium having computer-executable instructions stored thereon that are executable by a computing device to perform the method 600 of FIG. 6 and/or variations thereof. For example, a sender computing device may include a processor and the non-transitory computer-readable medium where the processor is configured to execute the computer-executable instructions stored on the non-transitory computer-readable medium to cause the sender computing device to perform any one or more of the operations 602, 604, and/or 606 of the method 600 and/or variations thereof.

Figure 7:
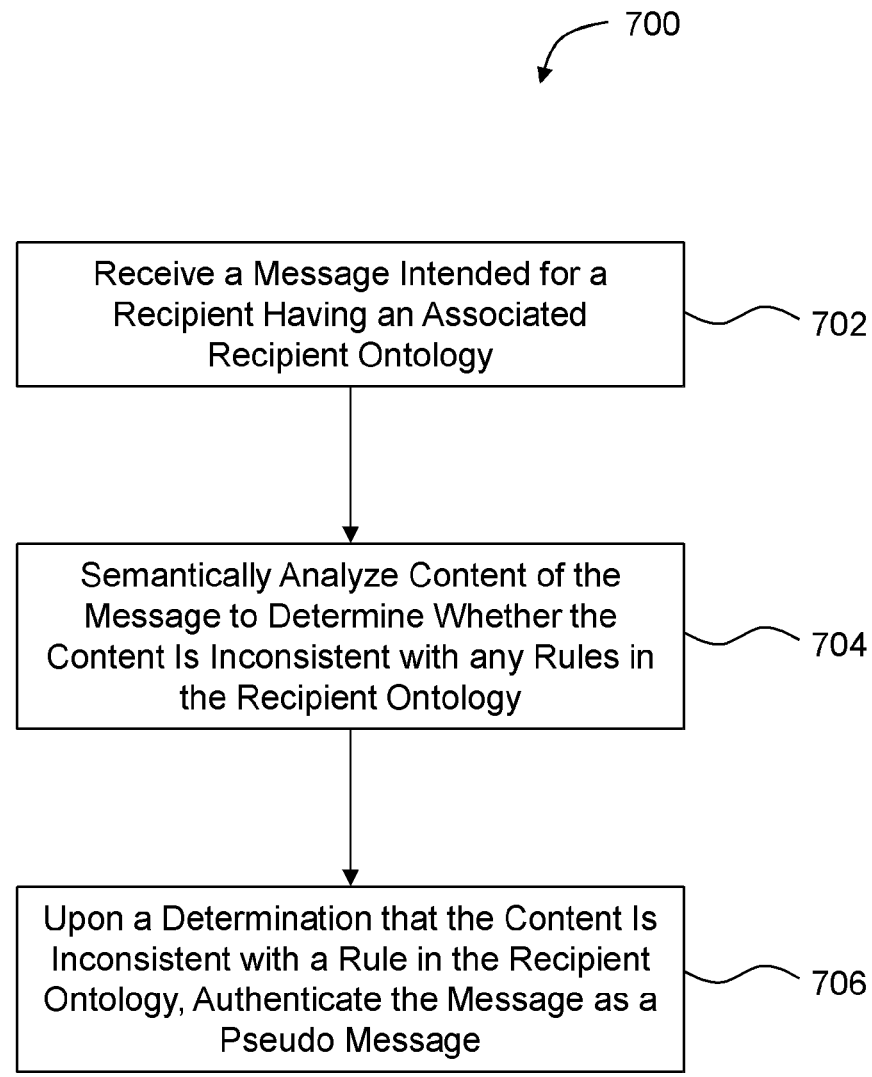
FIG. 7 shows an example flow diagram of a method for recognizing a pseudo message.

FIG. 7 shows an example flow diagram of a method 700 for recognizing a pseudo message, arranged in accordance with at least some embodiments described herein. The method 700 may be performed in whole or in part by a recipient, such as the recipient 106 or 504 of FIG. 1 or 5, which recipient may correspond to, e.g., the entity A 304 or the entity B 306 of FIG. 3. The method 700 includes various operations, functions or actions as illustrated by one or more of blocks 702, 704 and/or 706. The method 700 may begin at block 702.

In block 702 (Receive a Message Intended for a Recipient Having an Associated Recipient Ontology), a message intended for a recipient having an associated recipient Ontology may be received. In some embodiments, the message may be previously generated by a sender as described with respect to the method 600 of FIG. 6 above. Block 702 may be followed by block 704.

In block 704 (Semantically Analyze Content of the Message to Determine Whether the Content is Inconsistent with any Rules in the Recipient Ontology), content of the message may be semantically analyzed to determine whether the content is inconsistent with any rules in the recipient Ontology. In some embodiments, the content of the message may include text. In these and other embodiments, semantically analyzing content of the message to determine whether the content is inconsistent with a rule in the recipient Ontology may include parsing the text into one or more sentences.

For each of the one or more sentences, the sentence may be compared with rules in the recipient Ontology. If the sentence is false in view of any of the rules in the recipient Ontology, it may be determined that the content is inconsistent with a rule in the recipient Ontology. For example, if one of the sentences includes "James is the son of Jack" and the recipient Ontology includes a rule that "William is the son of Jack", then the sentence "James is the son of Jack" is false in view of the rule and it may be determined that the content of the message is inconsistent with at least one of the rules of the recipient Ontology. Alternately, if the sentence is not false in view of the rules in the recipient Ontology, it may be determined that the content is not inconsistent with a rule in the recipient Ontology.

In some embodiments, each sentence may be compared in turn, or in parallel, with rules in the recipient Ontology until all of the sentences have been analyzed and determined to be not false, or until at least one false sentence is identified. If all of the sentences are determined to be not false, then the message from which the sentences were parsed may be identified as a normal message and may be processed as already described above. Alternately, if at least one of the sentences is determined to be false, the message from which the sentences were parsed may be identified as a pseudo message.

More generally, and returning to FIG. 7, block 704 may be followed by block 706. In block 706 (Upon a Determination that the Content Is Inconsistent with a Rule in the Recipient Ontology, Authenticate the Message as a Pseudo Message), upon a determination that the content is inconsistent with a rule in the recipient Ontology, the message may be authenticated as a pseudo message.

Although not illustrated in FIG. 7, in some embodiments the method 700 may further include measuring one or more channel parameters of a channel over which the message was received based on the pseudo message. In some embodiments, when a recipient identifies a pseudo message as such, the recipient may send the measurements to the sender. Alternately or additionally, the sender may calculate or derive additional channel parameters from the measurements sent by the recipient to the sender. The one or more channel parameters may include, but are not limited to, error probability, satisfy degree or quality of service (QoS), throughput, delay variation, and jitter.

Alternately or additionally, the method 700 may further include determining a security level of the pseudo message based on a distance from a relationship edge associated with the rule in the recipient Ontology to a root node in the recipient Ontology. In some embodiments, the security level may be determined according to secu=α:dis, where α is a weighting constant such that $1/dis_{MAX} > \alpha > 0$, dis is a number of concept nodes from the root node to a concept node connected to the relationship edge that is farthest from the root node and $dis_{MAX}$ is the maximum dis in the recipient Ontology.

In some embodiments, a PRI of the pseudo message may be determined by the security level secu, where the higher the security level secu, the higher the PRI of the pseudo message. PRI can be used to authenticate an identity of the sender of the pseudo message, as a high PRI may indicate that the sender has relatively more intimate knowledge of the recipient than would be the case for a low PRI. Alternately or additionally, the recipient may preferentially process pseudo messages based on PRI. For instance, when multiple pseudo messages are received at about the same time, those with a higher PRI may be processed before those with a lower PRI.

In some embodiments, the method 700 may further include, prior to receiving the message, sending at least a portion of the recipient Ontology to a sender from which the message is received.

Some embodiments disclosed herein include a non-transitory computer-readable medium having computer-executable instructions stored thereon that are executable by a computing device to perform the method 700 of FIG. 7 and/or variations thereof. For example, a recipient computing device may include a processor and the non-transitory computer-readable medium where the processor is configured to execute the computer-executable instructions stored on the non-transitory computer-readable medium to cause the recipient computing device to perform any one or more of the operations 702, 704, and/or 706 of the method 700 and/or variations thereof.

Figure 8:
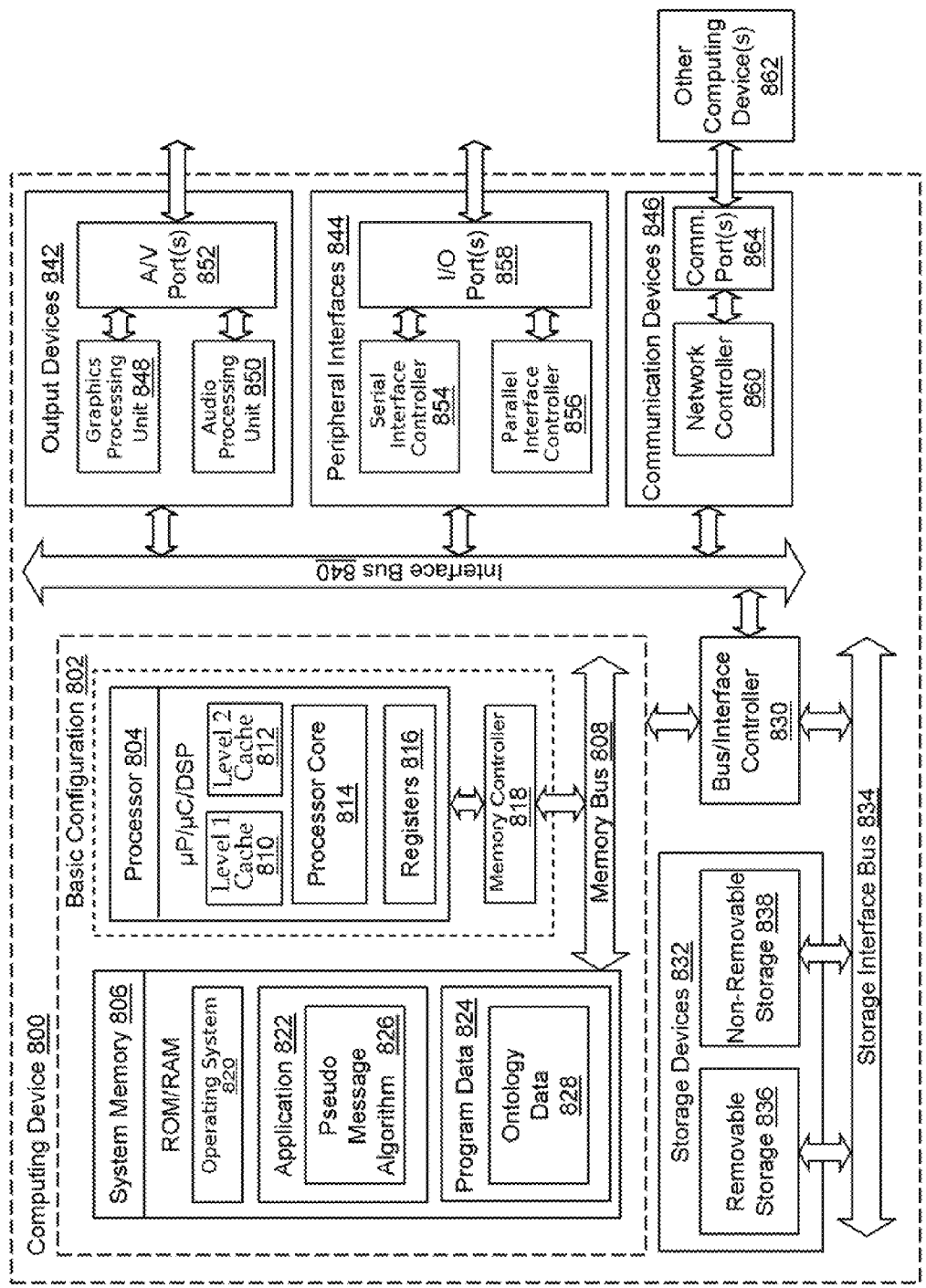
FIG. 8 is a block diagram illustrating an example computing device that is arranged for implementing pseudo message recognition based on Ontology reasoning, all arranged in accordance with at least some embodiments described herein.

FIG. 8 is a block diagram illustrating an example computing device 800 that is arranged for implementing pseudo message recognition based on Ontology reasoning, arranged in accordance with at least some embodiments described herein. The computing device 800 may correspond to, for instance, any one of the sender 104 or the recipient 106 of FIG. 1, or the entity A 304 or the entity B 306 of FIG. 3, or the sender 502 or the recipient 504 of FIG. 5. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a pseudo message algorithm 826 that is arranged to perform the functions as described herein including those described with respect to the process 200, 600, and/or 700 of FIGS. 2, 6, and/or 7. Program data 824 may include Ontology data 828 such as a "self" Ontology or an "other" Ontology, or the like that may be useful for configuring the pseudo message algorithm 826 as is described herein. In some embodiments, application 822 may be arranged to operate with program data 824 on operating system 820 such that Ontology-based pseudo message generation and/or pseudo message recognition based on Ontology reasoning may be provided as described herein. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to recognize a pseudo message among received messages, the method comprising:
receiving messages, including at least one pseudo message, intended for a recipient having an associated recipient Ontology;
semantically analyzing content of the received messages and comparing the analyzed content with rules in the recipient Ontology to determine whether the content of any of the received messages is inconsistent with any rules in the recipient Ontology; and upon a determination that any of the compared content of a received message among the received messages is inconsistent with a rule in the recipient Ontology, recognizing the received message as a pseudo message;

wherein the content of the pseudo message includes an error sentence that is inconsistent with the rule in the recipient Ontology, and background content into which the error sentence has been inserted; and wherein the background content is configured to obfuscate statistic characteristics of the pseudo message from eavesdroppers.

2. The method of claim 1, further comprising measuring one or more channel parameters of a channel over which the message was received based on the pseudo message.

3. The method of claim 2, wherein the one or more channel parameters include at least one of: time delay, error probability, or satisfy degree.

4. The method of claim 1, wherein the content of the message comprises text; and wherein semantically analyzing content of the received messages and comparing the analyzed content with rules in the recipient Ontology to determine whether the content of any of the received messages is inconsistent with any rules in the recipient Ontology comprises parsing the text into one or more sentences and for each of the one or more sentences:

comparing the sentence with rules in the recipient Ontology; and determining:

that the content is inconsistent with a rule in the recipient Ontology when the sentence is false in view of the rules in the recipient Ontology; or that the content is not inconsistent with a rule in the recipient Ontology when the sentence is not false in view of the rules in the recipient Ontology.

5. The method of claim 1, wherein the pseudo message containing content that is inconsistent with a rule in the recipient Ontology is intermixed among messages of the received messages containing true information so as to obfuscate the true information from eavesdroppers.

6. The method of claim 1, further comprising generating the recipient Ontology consistent with a predetermined Ontology structure comprising a plurality of concept nodes and a plurality of relationship edges, each of the plurality of relationship edges connected between a corresponding pair of the plurality of concept nodes.

7. The method of claim 6, further comprising determining a security level of the pseudo message based on a distance from a relationship edge associated with the rule in the recipient Ontology to a root node in the recipient Ontology.

8. The method of claim 7, wherein determining a security level of the pseudo message based on a distance from a relationship edge associated with the rule in the recipient Ontology to a root concept node in the recipient Ontology comprises determining the security level according to:

secu=α·dis, where:

secu is the security level;

α is a weighting constant such that $1/dis_{MAX} > \alpha > 0$;

$dis_{MAX}$ is the maximum dis in the recipient Ontology; and dis is a number of concept nodes from the root node to a concept node connected to the relationship edge that is farthest from the root node.

9. The method of claim 1, further comprising, prior to receiving the messages, sending at least a portion of the recipient Ontology to a sender from which the messages are received.

10. A non-transitory computer-readable medium having computer-executable instructions stored thereon that are executable by a computing device to perform the method of claim 1.

11. A method to generate a pseudo message recognizable as such by an intended recipient, the method comprising:

generating an error sentence that is inconsistent with a rule in a recipient Ontology associated with a recipient;

selecting a piece of text as background content; and inserting the error sentence into the background content to form the pseudo message.

12. The method of claim 11, wherein selecting a piece of text as background content includes selecting a word set that has at least a predetermined similarity to a normal word set that may be sent to the recipient in another message not including a pseudo message.

13. The method of claim 12, wherein the pseudo message is indistinguishable as such from the another message without access to the rule in the recipient Ontology.

14. The method of claim 12, wherein the selected word set is in an eXtensible Markup Language (XML) format and is denoted as $X_c$, and wherein $X_c$ is any candidate word set denoted $X_{candidate}$ such that:

$$S = SIM(M_k, X_{candidate}) = \frac{1}{m} \cdot \sum_{j=0}^{m} \max_{i=0}^{n} [sim(w_j^X w_j^M)] > T,$$

where:

$S=SIM(M_k, X_{candidate})$ is a calculated similarity between a normal word set $M_k$ and $X_{candidate}$;

T is the predetermined similarity;

$M_k = \{w_0^M, w_1^M, \ldots, w_i^M, \ldots, w_n^M\}$;

i is an integer from 0 to n;

$X_{candidate} = \{w_0^X, w_1^X, \ldots, w_j^X, \ldots, w_m^X\}$;

j is an integer from 0 to m;

$w_i^M$ denotes an arbitrary word in $M_k$;

$w_j^X$ denotes an arbitrary word in $X_{candidate}$;

$$sim(w_i, w_j) = \begin{cases} 1, & w_i = w_j \\ sim_{wordnet}, & w_i \neq w_j; \end{cases}$$

and $sim_{wordnet}$ is a similarity calculated according to WordNet.

15. The method of claim 11, wherein the background content is extracted from a web page.

16. The method of claim 11, wherein generating an error sentence that is inconsistent with a rule in the recipient Ontology comprises:

selecting the rule from among a plurality of rules of the recipient Ontology;

expressing the rule as a correct sentence; and replacing a word in the correct sentence, the word representing a concept of the rule, with an irrelevant word from an available lexicon to form the error sentence.

17. The method of claim 11, further comprising automatically generating and sending pseudo messages from a sender computing device when a corresponding sender is not actively operating the sender computing device to obfuscate an inactive status of the sender from eavesdroppers.

18. The method of claim 11, wherein the pseudo message is used to identify a security class of a sender of the pseudo message.

19. The method of claim 11, further comprising:
generating at least a portion of the recipient Ontology based on knowledge of a sender of the pseudo message; or
receiving at least a portion of the recipient Ontology from the recipient.

20. The method of claim 19, wherein the recipient and the sender each have access to at least a portion of a sender Ontology associated with the sender such that the recipient can generate and send pseudo messages recognizable as such by the sender by including in each pseudo message an error sentence inconsistent with a corresponding rule in the sender Ontology.

21. A non-transitory computer-readable medium having computer-executable instructions stored thereon that are executable by a computing device to perform the method of claim 11.

22. A system to generate and recognize pseudo messages, the system comprising:
a first processor; and
a first non-transitory computer-readable medium having computer-executable instructions stored thereon that are executable by the first processor to perform operations comprising:
receiving messages, including at least one pseudo message, intended for a recipient having an associated recipient Ontology;
semantically analyzing content of each received message and comparing the analyzed content with rules in the recipient Ontology to determine whether the content of any of the received messages is inconsistent with any rules in the recipient Ontology; and
upon a determination that any of the compared content of the received messages is inconsistent with a rule in the recipient Ontology, recognizing a message having the compared content that is inconsistent with a rule in the recipient Ontology as a pseudo message;
wherein the content of the pseudo message includes an error sentence that is inconsistent with the rule in the recipient Ontology, and background content into which the error sentence has been inserted; and
wherein the background content is configured to obfuscate statistic characteristics of the pseudo message from eavesdroppers.

23. The system of claim 22, wherein the first processor and the first non-transitory computer-readable medium are associated with a recipient computing device, the system further comprising a sender computing device including a sender processor and a sender non-transitory computer-readable medium having stored thereon at least a portion of the recipient Ontology implemented as a first data structure.

24. The system of claim 23, wherein the first non-transitory computer-readable medium has stored thereon the recipient Ontology implemented as a second data structure.

25. The system of claim 24, wherein:
the sender non-transitory computer-readable medium has further stored thereon a sender Ontology implemented as a third data structure;
the first non-transitory computer-readable medium has further stored thereon at least a portion of the sender Ontology implemented as a fourth data structure;
the third and fourth data structures are respectively accessible by each of the sender and first processors such that the recipient computing device is configured to generate and send pseudo messages recognizable as such by the sender computing device by including in each pseudo message content that is inconsistent with a rule in the sender Ontology.

* * * * *